FUNCTION GENERATORS

Filed Aug. 11, 1960 3 Sheets-Sheet 1

INVENTORS
WILLIAM L. McDERMID
HAROLD E. PETERSEN
GLENMORE L. SHELTON JR.

BY Francis J. Thomas
ATTORNEY

United States Patent Office 3,036,775

Patented May 29, 1962

3,036,775
FUNCTION GENERATORS

William L. McDermid, Peekskill, Harold E. Petersen, Chappaqua, and Glenmore L. Shelton, Jr., Mahopac, N.Y., assignors to International Business Machines Corporation, New York, N.Y., a corporation of New York Filed Aug. 11, 1960, Ser. No. 48,897
5 Claims. (Cl. 235—165)

This invention relates to function generators, and in particular, to autocorrelation function and cross-correlation function generators.

Autocorrelation of a function provides a measure of the similarity between a function and itself, shifted through various displacements, whereas cross-correlation of two functions provides a measure of the similarity between the functions.

Autocorrelation function and cross-correlation function generators are useful in many areas, as for example in the examination of signals taken in the collection of measurements on physical objects such as in the character recognition and seismographic exploration fields.

The correlation function generators previously known in the art have been confined to a single functional purpose; for example autocorrelation or cross-correlation.

What has been discovered is a simple and fast correlation generator adaptable for auto or cross-correlation purposes. The correlation generator of this invention reduces the time required for correlation to fewer serial operations by the use of a unique scheme of serial and parallel operation and the invention further permits autocorrelation function and cross-correlation function generation to be accomplished with a single apparatus making common use of a considerable part of the apparatus for both generators.

An object of this invention is to provide an apparatus for either autocorrelation function or cross-correlation function generation using the same structure.

Another object is to provide an apparatus for either autocorrelation function or cross-correlation function generation utilizing common electronic circuits.

A further object of this invention is to provide simple, high-speed, digital and analog autocorrelation function generators.

Another object is to provide simple, high-speed digital and analog cross-correlation function generators.

The foregoing and other objects, features and advantages of the invention will be apparent from the following more particular description of electronic embodiments of the invention, as illustrated in the accompanying drawings.

These objects are achieved by digital and analog embodiments using time-controlled comparison of the input with itself when autocorrelating, and time-controlled comparison of the two inputs when cross-correlating.

Figure 2:
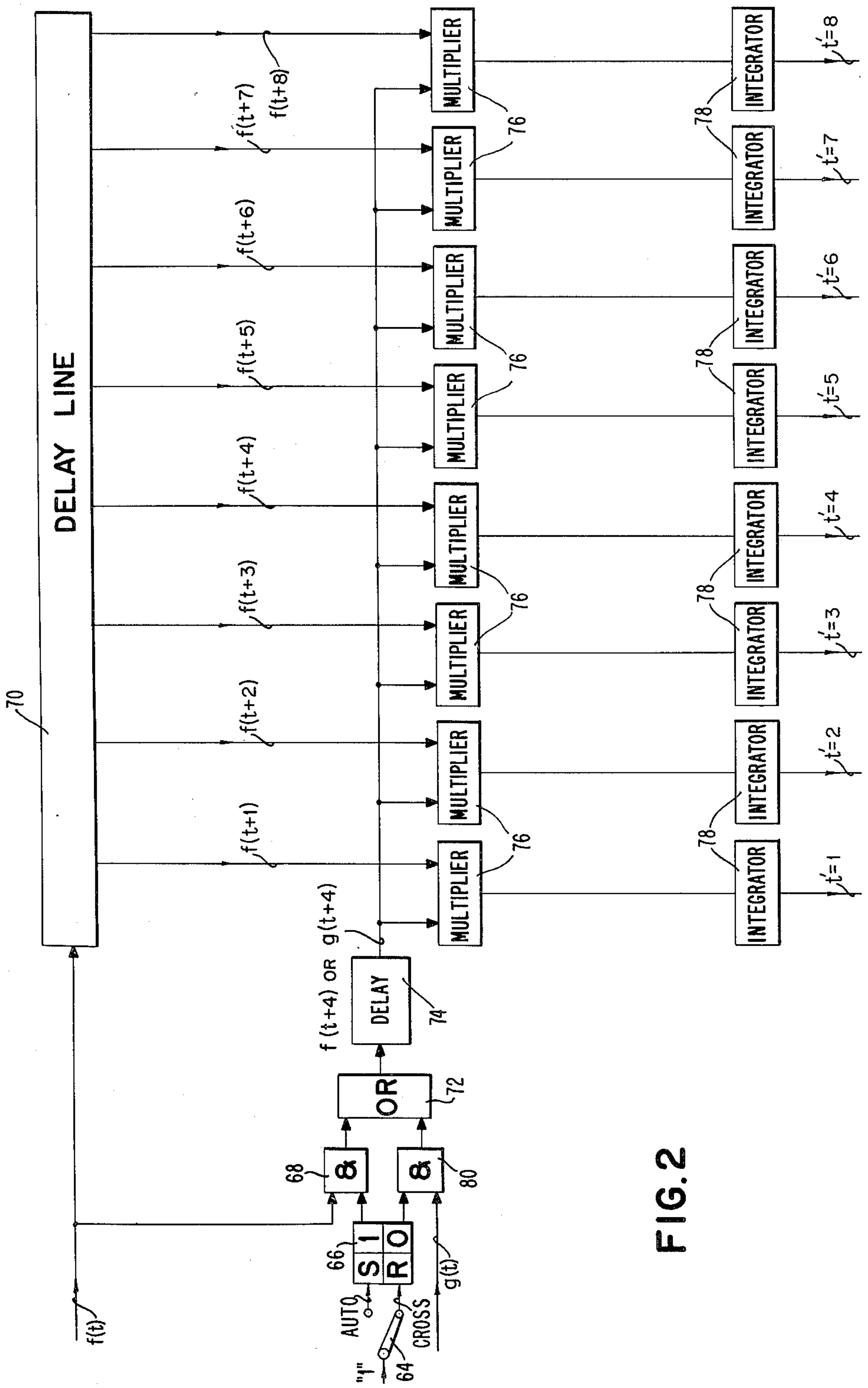
FIG. 2 is a schematic diagram of an analog embodiment of an autocorrelation function and cross-correlation function generator.
Figure 3A:
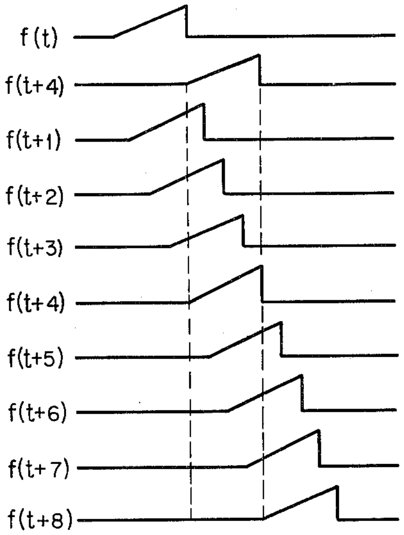
Figure 3B:
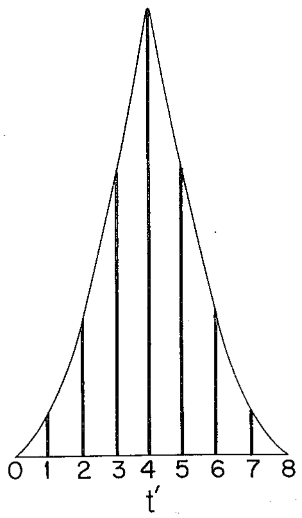

FIGS. 3*a* and 3*b* are diagrams showing the operation of the embodiment of FIG. 2 when autocorrelating.

Figure 4A:
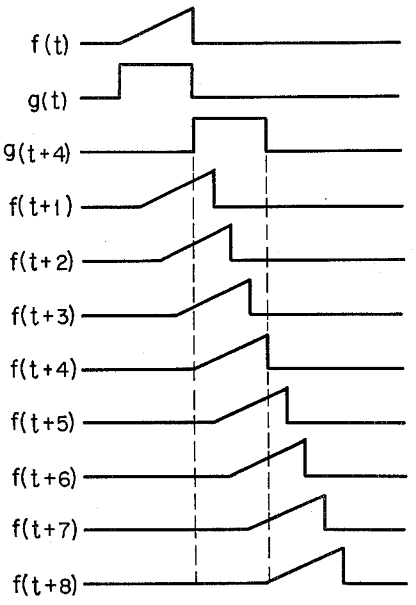
Figure 4B:
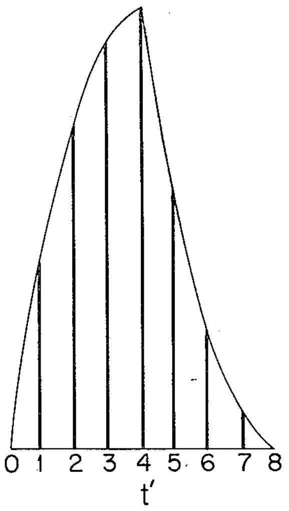

FIGS. 4*a* and 4*b* are diagrams showing the operation of the embodiment of FIG. 2 when cross-correlating.

The autocorrelation function of a function of time may be described as a measure of its correlation or its similarity with respect to itself over all time displacements. Let the following example be considered. If the input function is defined as $f(t)$, its autocorrelation function $f(t')$ is defined as:

$$f(t') = \Sigma_t f(t) \cdot f(t+t')$$

where $t'$=time displacement. For example: the autocorrelation sum of a discrete input function: $f(t)=1011$ equals 3 for $t'=0$ as order-by-order multiplication of the function with itself, not displaced, provides products 1, 0, 1 and 1 which are summed to obtain 3. For $t'=1$, indicating that the product of the function and the function displaced by one unit are to be taken, the products 0, 0, 0 and 1 are obtained, providing a sum of 1. Similarly, $t'=2$ and $t'=3$ provide a sum of 1. The autocorrelation function is symmetric, providing the same sums for positive and negative (right and left) displacements. The following table indicates the autocorrelation function of the input function 1011.

| $t$ | −3 | −2 | −1 | 0 | 1 | 2 | 3 |
|---|---|---|---|---|---|---|---|
| $f(t')$ | 1 | 1 | 1 | 3 | 1 | 1 | 1 |

The cross-correlation function of two functions of time may be described as a measure of their similarity over all time displacements. An example of a cross-correlation function is as follows. If the two functions are defined as $f(t)$ and $g(t)$ then their cross-correlation function $f(t')$ is defined as:

$$f(t') = \Sigma_t f(t) \cdot g(t+t')$$

where $t'$=time displacement. For example: the cross-correlation sum of discrete input functions: $f(t)=1011$, $g(t)=1100$ equals 1 for $t'=0$ as an order-by-order multiplication of the bits yields 1, 0, 0 and 0, which is summed into 1. For $t'=1$, indicating a displacement of $g(t)$ one bit to the right, the products 0, 0, 1 and 0 are obtained, again providing a sum of 1. At $t'=2$, a sum of 2 is obtained; at $t'=3$, a sum of 1 is obtained. Any shifts beyond 3 provide all zero products. A shift of −1 provides a sum of 1; a shift of −2 a sum of 0; and a shift of −3, a sum of 0. The cross-correlation function for the example given may be written:

| $t'$ | −3 | −2 | −1 | 0 | 1 | 2 | 3 |
|---|---|---|---|---|---|---|---|
| $f(t')$ | 0 | 0 | 1 | 1 | 1 | 2 | 1 |

Autocorrelation functions and cross-correlation functions may be generated from continuous inputs using the calculus. They may also be discretely generated from continuous input functions. The embodiments shown and described illustrate the generation of discrete (digital) autocorrelation functions and cross-correlation functions of both discrete (digital) and continuous (analog) input functions.

Figure 1:
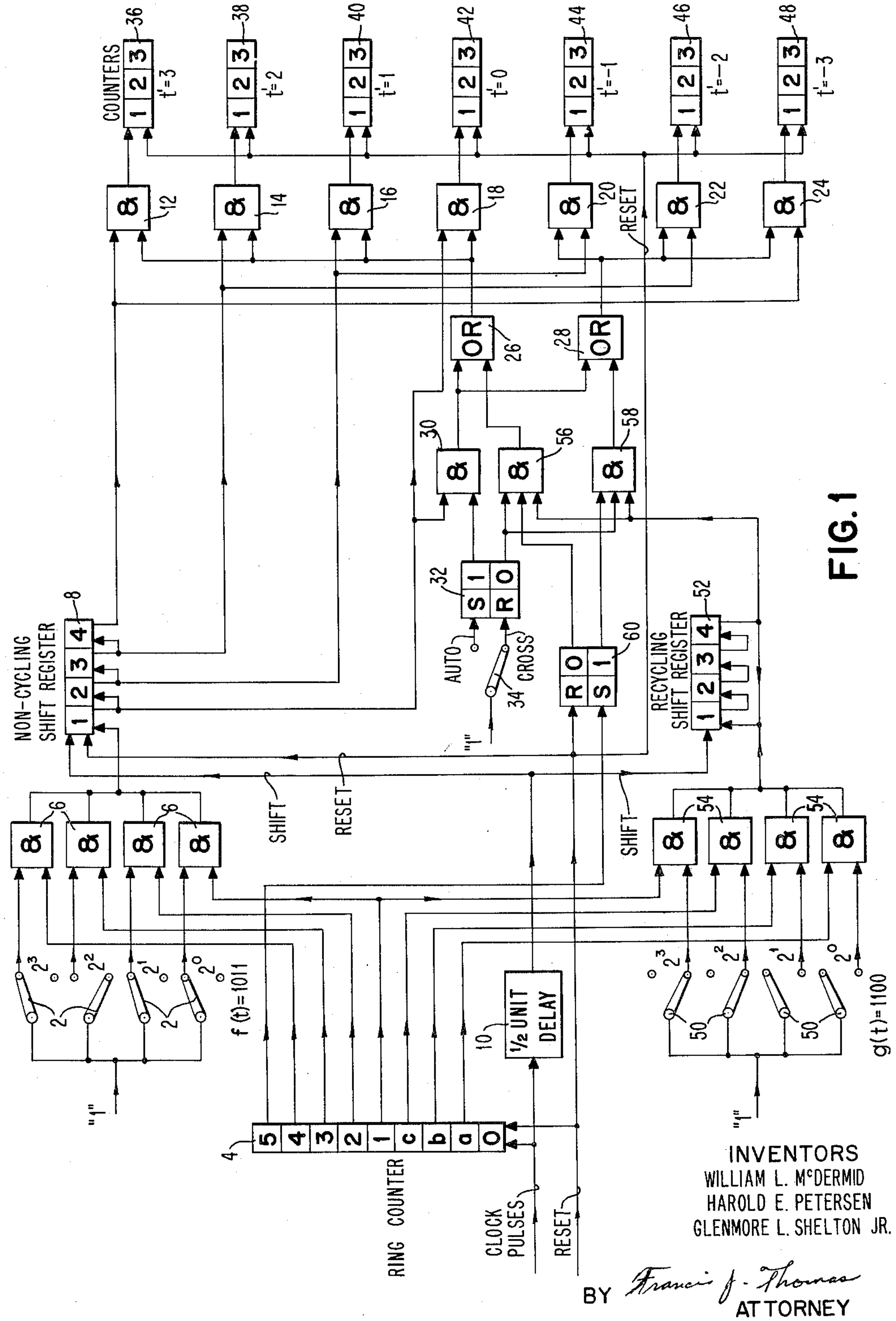
FIG. 1 is a schematic diagram of a digital embodiment of an autocorrelation function and cross-correlation function generator.

Referring to FIG. 1, discrete autocorrelation function generation is shown using a digital embodiment and described with respect to a four-digit binary number. It will be apparent to one skilled in the art that the principles could be extended to a greater number of digits in any radix. The input binary word may represent a variety of information, such as the result of discretely sampling a function.

When autocorrelating, switches 2 are set to represent the input word. The switches are closed to indicate a "1" and opened to indicate a "0." In the drawing, the switches are shown in the positions required to indicate the binary word "1011."

A ring counter 4 provides an output on one lead at a time in sequence. This counter is initially reset to its "0" position by a reset pulse to the system, and is stepped one position by each clock pulse applied to the system. The numbers in the block of the counter refer to time, where time "1" occurs between the application of the fourth and fifth clock pulses; time 2 occurs between the fifth and sixth clock pulse; etc. Counter outputs "*a*," "*b*," and "*c*" occur before time "1," and their function will be explained with respect to the cross-correlation function generator.

At time "1," "and" gate 6 is conditioned and the least-significant bit ($2^0$) of the input word is applied to the lowest order input of a shift register 8. This register is initially reset to "0000." The clock pulses are delayed one-half unit of time by delay 10 and are applied to shift the data in the shift register one position at every "half-time" such as "1½," "2½," "3½," etc. At time "1½," the least-significant bit of the input word is shifted to the second position of register 8. The $2^1$ bit of the input word is applied to the lowest order of shift register at time "2." At time "2½," both bits stored in the register are shifted. In a similar manner, the remainder of the input word is placed in the register during times "3" and "4." The data in the register is further shifted at times "4½," "5½," "6½," and "7½" until at time "8," the register contains "0000."

A group of "and" gates 12—24 is connected to various shift register 8 outputs through "or" gates 26, 28 and "and" gate 30. A flip-flop 32 controls the operation of "and" gate 30, causing it to be conditioned when autocorrelating, under control of a switch 34 when placed at the "auto" position. The information in Table I indicates the data in shift register 8 and the inputs to "and" gates 12—24 during the operation of the circuit.

In the example shown, a four-digit word is autocorrelated, requiring four, non-redundant "and" gates 12, 14, 16 and 18 and four non-redundant counters 36, 38, 40 and 42. To autocorrelate an "*n*-digit" number, *n* "and" gates and counters are required. If "and" gate 18, corresponding to the $t'=0$ output is considered as the first "and" gate; "and" gate 16, corresponding to the $t'=1$ output, is considered as the second "and" gate, etc.; and time "1" represents the time the first digit is applied to the first "and" gate, then the digits of the number are applied in sequence to the first "and" gate during times "1" through "*n*," to the second "and" gate during times "2" through "$n+1$," etc.; to the "*i*" "and" gate during times "*i*" through "$n+i-1$." The digits of the input number are also applied simultaneously to all "and" gates sequentially during times "1" through "*n*."

Since binary data is considered in this embodiment, "and" gates and binary counters are shown. Higher radix digital multipliers and accumulators are used with higher radix data.

The discrete autocorrelation function of a discrete input function is thus generated by a group of summations of products of discrete portions of the function according to the formula $$f(t')=\Sigma_t f(t).f(t+t')$$

Cross-correlation generation, being a measure of the similarity of two functions, requires two inputs. Two groups of switches 2 and 50 are set to indicate the numbers to be cross-correlated. These numbers may represent discrete samplings of functions or any other data to be non-correlated. In the drawings, switches 2 represent the binary word "1011" and switches 50 represent "1100."

A recycling shift register 52 is serially loaded with the word indicated by switches 50 through "and" gates 54. The $2^0$ bit is applied to the register at the time the ring counter 4 has an output from its "*a*" section; the $2^1$ bit at the time an output is present from its "*b* section; the $2^2$ bit at the time an output is present from the "*c*" section; and the $2^3$ at time "1." This register has an output from its highest order which is fed back to the lowest order and applied to "and" gates 56 and 58.

When cross-correlating, switch 34 is placed at "cross"

*Table I*

| Time | shift register 8 | | | | "and" gates | | | | | | | | | | | | | |
|---|---|---|---|---|---|---|---|---|---|---|---|---|---|---|---|---|---|---|
| | 1 | 2 | 3 | 4 | 12 | | 14 | | 16 | | 18 | | 20 | | 22 | | 24 | |
| 0 | ----- | ----- | ----- | ----- | ----- | ----- | ----- | ----- | ----- | ----- | ----- | ----- | ----- | ----- | ----- | ----- | ----- | ----- |
| 1 | $2^0$ | ----- | ----- | ----- | $2^0$ | ----- | $2^0$ | ----- | $2^0$ | ----- | $2^0$ | $2^0$ | $2^0$ | ----- | $2^0$ | ----- | $2^0$ | ----- |
| 2 | $2^1$ | $2^0$ | ----- | ----- | $2^1$ | ----- | $2^1$ | ----- | $2^1$ | $2^0$ | $2^1$ | $2^1$ | $2^1$ | $2^0$ | $2^1$ | ----- | $2^1$ | ----- |
| 3 | $2^2$ | $2^1$ | $2^0$ | ----- | $2^2$ | ----- | $2^3$ | $2^0$ | $2^2$ | $2^1$ | $2^2$ | $2^2$ | $2^2$ | $2^1$ | $2^2$ | $2^0$ | $2^2$ | ----- |
| 4 | $2^3$ | $2^2$ | $2^1$ | $2^0$ | $2^3$ | $2^0$ | $2^3$ | $2^1$ | $2^3$ | $2^2$ | $2^3$ | $2^3$ | $2^3$ | $2^2$ | $2^3$ | $2^1$ | $2^3$ | $2^0$ |
| 5 | ----- | $2^3$ | $2^2$ | $2^1$ | ----- | $2^1$ | ----- | $2^2$ | ----- | $2^3$ | ----- | ----- | ----- | $2^3$ | ----- | $2^2$ | ----- | $2^1$ |
| 6 | ----- | ----- | $2^3$ | $2^2$ | ----- | $2^2$ | ----- | $2^3$ | ----- | ----- | ----- | ----- | ----- | ----- | ----- | $2^3$ | ----- | $2^2$ |
| 7 | ----- | ----- | ----- | $2^3$ | ----- | $2^3$ | ----- | ----- | ----- | ----- | ----- | ----- | ----- | ----- | ----- | ----- | ----- | $2^3$ |
| 8 | ----- | ----- | ----- | ----- | ----- | ----- | ----- | ----- | ----- | ----- | ----- | ----- | ----- | ----- | ----- | ----- | ----- | ----- |

Each "and" gate 12—24 output is summed in an associated counter 36 through 48. The final sum in counter 42 equals $2^0.2^0+2^1.2^1+2^2.2^2+2^3.2^3$ which could be expressed as the $f(0)$ term of the autocorrelation function:

$$f(0)=\Sigma_t f(t).f(t+0)$$

Similarly, the sum in counter 40 equals $2^1.2^0+2^2.2^1+2^3.2^2$ which could be expressed as the $f(1)$ term of the autocorrelation function:

$$f(1)=\Sigma_t f(t).f(t+1)$$

Counter 38 contains the autocorrelation sum for $t'=2$ and counter 36 the autocorrelation sum for $t'=3$. Counters 44, 46 and 48 contain the same data as counters 40, 38 and 36 respectively due to the symmetry of the autocorrelation function and are, hence, redundant for purposes of autocorrelation. They will be shown to be necessary for cross-correlation generation.

resetting flip-flop 32 to provide a "1" output to condition "and" gates 56 and 58.

A cycle control flip-flop 60 is initially reset for a first cycle by the reset pulse applied to the system and is set for a second cycle at time "5" by a signal from ring counter 4. During the first cycle "and" gate 56 is conditioned; during the second cycle "and" gate 58 is conditioned. Thus, during times "1" through "4," the word determined by switches 50 is applied sequentially, with the least-significant bit first, through "and" gate 56 and "or" gate 26 to "and" gates 12, 14, 16 and 18. After time "4," the output of the shift register 52 is repeated every four intervals of time: at time "5," the least significant ($2^0$) bit is applied through "and" gate 58 and "or" gate 28 to "and" gate 20, 22, and 24; at time "6," the $2^1$ bit is applied to "and" gates 20, 22 and 24; at time "7," and $2^2$ bit is applied, etc. As will be described below, the outputs of shift register 52 after time "7" are not used.

Shift register 8 operates as described with respect to autocorrelation generation, however, its first order output is inhibited by "and" gate 30 because flip-flop 32 is reset when cross-correlating.

The information in Table II indicates the data applied to "and" gates 12 through 24 during the operation of the circuit when cross-correlating.

*Table II*

| Time | "and" gates | | | | | | | | | | | | | |
|---|---|---|---|---|---|---|---|---|---|---|---|---|---|---|
| | 12 | | 14 | | 16 | | 18 | | 20 | | 22 | | 24 | |
| | $f(t)$ | $g(t)$ | $f(t)$ | $g(t)$ | $f(t)$ | $g(t)$ | $f(t)$ | $g(t)$ | $f(t)$ | $g(t)$ | $f(t)$ | $g(t)$ | $f(t)$ | $g(t)$ |
| 0 | | | | | | | | | | | | | | |
| 1 | | $2^0$ | | $2^0$ | | $2^0$ | $2^0$ | $2^0$ | | | | | | |
| 2 | | $2^1$ | | $2^1$ | $2^0$ | $2^1$ | $2^1$ | $2^1$ | $2^0$ | | | | | |
| 3 | | $2^2$ | $2^0$ | $2^2$ | $2^1$ | $2^2$ | $2^2$ | $2^2$ | $2^1$ | | $2^0$ | | | |
| 4 | $2^0$ | $2^3$ | $2^1$ | $2^3$ | $2^2$ | $2^3$ | $2^3$ | $2^3$ | $2^2$ | | $2^1$ | | $2^0$ | |
| 5 | $2^1$ | | $2^2$ | | $2^3$ | | | | $2^3$ | $2^0$ | $2^2$ | $2^0$ | $2^1$ | $2^0$ |
| 6 | $2^2$ | | $2^3$ | | | | | | | $2^1$ | $2^3$ | $2^1$ | $2^2$ | $2^1$ |
| 7 | $2^3$ | | | | | | | | | $2^2$ | | $2^2$ | $2^3$ | $2^2$ |
| 8 | | | | | | | | | | $2^3$ | | $2^3$ | | $2^3$ |
| 9 | | | | | | | | | | $2^0$ | | $2^0$ | | $2^0$ |

Each "and" gate 12 through 24 output is summed in an associated counter 36 through 48. The sums are complete after time "7" as after this time no "and" gates have two applied inputs. The final sum in counter 42 equals $$f(2^0)\cdot g(2^0)+f(2^1)\cdot g(2^1)+f(2^2)\cdot g(2^2)+f(2^3)\cdot g(2^3)$$

which could be expressed as the $f(0)$ term of the cross-correlation function:

$$f(0)=\Sigma_t f(t)\cdot g(t+0)$$

Similarly, the final sum in counter $$40=f(2^0)\cdot g(2^1)+f(2^1)\cdot g(2^2)+f(2^2)\cdot g(2^3)$$

which could be expressed as the $f(1)$ term of the cross-correlation function:

$$f(1)=\Sigma_t f(t)\cdot g(t+1)$$

Counter 38 contains the cross-correlation sum for $t'=2$; counter 36, the sum for $t'=3$; counter 44, the sum for $t'=-1$; counter 46, the sum for $t'=-2$; and counter 48, the sum for $t'=-3$.

In the example shown, two four-digit numbers are cross-correlated requiring a group of four "and" gates 12, 14, 16 and 18 and four counters 36, 38, 40 and 42 for the first cycle of operation and a group of three "and" gates 20, 22 and 24 and three counters 44, 46 and 48 for the second cycle of operation. Generalizing, if $n$-digit numbers are to be cross-correlated, the first cycle of operation requires $n$ "and" gates and counters, the second cycle of operation requires $n-1$ "and" gates and counters, and the first cycle of operation occurs during times "1" through "$n$" and the second cycle of operation occurs during times "$n+1$" through "$2n-1$." If "and" gate 18, corresponding to the $t'=0$ output, is considered as the first "and" gate of the first group; "and" gate 16, corresponding to the $t'=1$; output, is considered as the second "and" gate of the first group; etc.; and "and" gate 20, corresponding to the $t'=-1$ output, is considered as the first "and" gate of the second group; "and" gate 22 corresponding to the $t'=-2$ output, is considered as the second "and" gate of the second group, etc.; and time "1" represents the time that the first digit is applied to any "and" gate; then the digits of the number stored in the recycling shift register are sequentially applied to all of the first group of "and" gates during times "1" through "$n$," and to all of the second group of "and" gates during times "$n+1$" through "$2n-1$" (one of the digits in the recycling shift register is not required in the second cycle of operation) and the digits in the non-cycling shift register are sequentially applied to the first "and" gate in the first group during times "1" through "$n$," to the second "and" gate in the first group during times "2" through "$n+1$," to the "$i$" "and" gate of the first group during times "$i$" through "$n+i-1$"; and to the first "and" gate of the second group during times "2" through "$n+1$," to the second "and" gate of the second group during times "3" through "$n+2$," and to the "$j$" "and" gate of the second group during times "$j+1$" through "$n+j$."

Since binary data are considered in this embodiment, "and" gates and binary counters are shown. Higher radix digital multipliers and accumulators are used with higher-radix data.

The discrete cross-correlation function of a discrete input function is thus generated by a group of summations of products of discrete portions of one input function multiplied by discrete portions of the second input function according to the formula:

$$f(t')=\Sigma_t f(t)\cdot g(t+t')$$

The circuit in FIGURE 1 is thus shown to selectably generate either autocorrelation functions or cross-correlation functions in a simple digital apparatus at a high speed.

Referring next to FIGURE 2, there is shown a schematic diagram of an analog autocorrelation function and cross-correlation function generation that accepts either analog or digital (in the form of a pulse train) input data and generator analog outputs indicative of discrete portions of the autocorrelation or cross-correlation function.

When autocorrelating, a switch 64 sets flip-flop 66, providing a conditioning signal for "and" gate 68. The single input $f(t)$ is applied to a tapped delay line 70 and through "and" gate 68 and "or" gate 72 to a delay 74, which delay is equal to or greater than the duration of the input $f(t)$. For this explanation, $f(t)$ is presumed to have a duration of four units of time and delay 74 is presumed to delay the input for four units of time, generating $f(t+4)$. The tapped delay line 70 is shown to provide eight outputs, each separated by one unit of time. Although it should be noted that a greater number of taps separated by smaller time intervals would permit the generation of discrete output functions more closely approximating continuous functions. It is necessary that delay 74 equal or exceed the input function duration and that delay 70 equal or exceed the sum of delay 74 and the input function duration.

FIGURE 3*a* is a diagram showing the various signals present in the circuit of FIGURE 2 when autocorrelating a sawtooth waveshape. A group of eight analog multipliers (FIGURE 2) 76 continuously provide the products $f(t+4)\ f(t+t')$ *for* $t'$ at discrete intervals from $t'=1$ through $t'=8$, which is identical to the products $$f(t)\cdot f(t+t')$$

for $t'$ at discrete values from $-3$ through 4. Use of the four unit delay 74 is necessary due to the impossibility of providing negative time delays from the tapped delay line 70. Since the autocorrelation function is symmetric, delay 74 could be bypassed and products $f(t) \cdot f(t+t')$ would be generated from $t=1$ through $t=3$. In this case a multiplier 76 would require an $f(t+0)$ input to generate the unshifted ($t'=0$) output. The multipliers may be any of the well-known analog multipliers, such as found in FIGURE 8–2 of a book entitled Analog Computer Techniques, authored by Clarence L. Johnson, 1956 and published by McGraw Hill.

A group of integrators 78 sum their analog inputs to provide analog output indications of the autocorrelation function at circuits coupled points separated by unit time intervals. FIGURE 3*b* shows the resulting autocorrelation function.

When cross-correlating, switch 64 (FIGURE 2) causes flip-flop 66 to be reset, providing a conditioning signal for "and" gate 80, and inhibiting "and" gate 68. In this case, a second input $g(t)$ is applied through "and" gate 80 and "or" gate 72 to delay 74 where $g(t+4)$ is generated. The input $f(t)$ is applied to the tapped delay 70. FIGURE 4*a* shows the waveform present at various points in the circuit when cross-correlating a sawtooth waveform and a rectangular waveform. Multipliers 76 and integrators 78 (FIGURE 2) generate discrete points of the cross-correlation function of the inputs. FIGURE 4*b* shows the resulting cross-correlation function.

High speed, simple electronic correlation function generators have been shown capable of selective autocorrelation function or cross-correlation function generation. Both autocorrelation functions and cross-correlation functions are discretely generated from either discrete or continuous input functions, using time-controlled comparison of the input with itself when autocorrelating and time-controlled comparison of the two inputs when cross-correlating.

While the invention has been particularly shown and described with reference to preferred embodiments thereof, it will be understood by those skilled in the art that various changes in form and details may be made therein without departing from the spirit and scope of the invention.

What is claimed is:

1. An apparatus for cross-correlating two functions sampled at $n$ discrete points, where each sampled value is referred to as a digit of an $n$-digit number comprising, in combination: a first group of $n$ multipliers, a second group of $n-1$ multipliers; means to sequentially apply the digits of the first number simultaneously to all of the first group of multipliers during times 1 through $n$ and to sequentially apply the digits of the first number simultaneously to all of the second group of multipliers during times $n+1$ through $2n-1$; digit transfer means sequentially applying the digits of the second number to the first of the first group of multipliers during times 1 through $n$, sequentially applying the digits of the second number to a second of the first group of multipliers during times 2 through $n+1$, sequentially applying the digits of the second number to a third of the first group of multipliers during times 3 through $n+2$, correspondingly sequentially applying the digits of the second number to each remaining multiplier "$i$" of the first group of multipliers during times $i$ through $n+i-1$, sequentially applying the digits of the second number to the first of the second group of multipliers during times 2 through $n+1$, sequentially applying the digits of the second number to the second of the second group of multipliers during times 3 through $n+2$, and correspondingly applying the digits of the second number to each remaining multiplier "$j$" of the second group of multipliers during times $j+1$ through $n+j$; and $2n-1$ accumulators, each to sum the products developed by a multiplier of each group of multipliers, whereby the sums in the accumulators at time $2n-1$ are indicative of the cross-correlation function of the input numbers.

2. An apparatus for generating the cross-correlation function of two-$n$-bit binary words, where each bit is either a "1" or a "0" comprising, in combination: a non-cycling shift register having "$n$" orders and an output corresponding to the data in each order; a recycling shift register having "$n$" orders and an output corresponding to the data in the highest order, said recycling shift register originally containing one of the two binary words with the least significant bit in the highest order position, and the remaining bits of consecutively higher significance in the register positions of consecutively lower order; means to apply the bits of the other word in consecutive significance, starting with the least significant bit, to the lowest order of the non-cycling shift register; a first plurality of "$n$" coincidence means, each having two operative inputs during a first cycle of operation, one from an order of the non-cycling shift register and one from the highest order of the recycling shift register, to provide an indication when both inputs are "1," a second plurality of $n-1$ coincidence means, each having two operative inputs during a second cycle of operation, one from one of the $n-1$ highest orders of the non-cycling shift register and one from the highest order of the recycling shift register, to provide an indication when both inputs are "1"; means to simultaneously shift the data in both shift registers; cycle control means in time-relation with the shifting means to inhibit the generation of outputs from the second plurality of coincidence means for a first cycle terminated after $n$ operations of the first plurality of coincidence means, and to inhibit the generation of indications from the first plurality of coincidence means for a second cycle begun after $n$ operations of the first plurality of coincidence means; and a plurality of $2n-1$ counters, each having its input connected to the output of a coincidence means for accumulating the sum of coincidence indications of the corresponding coincidence means, whereby the sums in the counters after $2n-1$ shifts of the registers are indicative of the cross-correlation function of the input words.

3. An apparatus for autocorrelating an $n$-bit binary word, where each bit is either a "1" or a "0," comprising in combination: a non-cycling shift register having "$n$" orders and an output corresponding to the data in each order; means to apply the bits of the $n$-bit word in sequence from the first bit to the $n$th bit, to the first order of the shift register; a plurality of coincidence means, each having a first and a second input, where each first input is responsive to an output from a different shift register order and where each second input is responsive to the output of the first order of the shift register, and each to provide an indication when both inputs are "1"; means to shift the data in the shift register; a plurality of counters, each having its input connected to the output of a coincidence means for accumulating the sum of coincidence indications of the corresponding coincidence means, whereby the sums accumulated in the counters are indicative of the autocorrelation function of the input word.

4. A cross-correlation function and autocorrelation function generator for functions sampled at $n$ discrete points, where each sampled value is referred to as a digit of $n$, $n$-digit numbers comprising, in combination: a first plurality of $n$ multipliers; a second plurality of $n-1$ multipliers; function control means for providing a first output when autocorrelating and a second output when crosscorrelating; means to sequentially apply the digits of the first number to a first multiplier of the first plurality of multipliers during times 1 through $n$, to sequentially apply the digits of the first number to a second multiplier of the first plurality of multipliers during times 2 through $n+1$, to sequentially apply the digits of the first number to a third multipler of the first plurality of multipliers during times 3 through $n+2$, and to correspondingly sequentially apply digits of the first number to each remaining multiplier "$i$" of the first plurality of multipliers during times "$i$" through $n+i-1$; means responsive to the function control means to sequentially apply the digits of the first number simultaneously to all of the first plurality of multipliers when autocorrelating; means responsive to the function control values to sequentially apply the digits of a second number simultaneously to all of the first plurality of multipliers when cross-correlating; means to sequentially apply the digits of the first number to the first of the second plurality of multipliers during times 2 through $n+1$, means to sequentially apply the digits to the first number to the second plurality of multipliers during 3 through $n+2$ and to correspondingly apply the digits of the first number to each remaining multiplier "$i$" of the second plurality of multipliers during times $i+1$ through $n+i$; means responsive to the function control means to sequentially apply the digits of the second number simultaneously to all of the second plurality of multipliers during time $n+1$ through $2n-1$ when cross-correlating; and a plurality of $2n-1$ accumulators, each to sum the products developed by a multiplier of each plurality of multipliers, whereby the sums of the accumulators at time $2n+1$ are indicative of the cross-correlation functions of the input numbers when cross-correlating and at time $n$ and indicative of the autocorrelation function of the input number when autocorrelating.

5. An apparatus for autocorrelating an $n$-bit binary word, where each bit is either a "1" or a "0," comprising in combination; a non-cycling shift register having "$n$" orders and an output corresponding to the data in each order; means to apply the bits of the $n$-bit word in sequence from the first bit to the $n$th bit, to the first order of the shift register; a plurality of coincidence means, each having a first and a second input, where each first input is responsive to an output from a different shift register order and where each second input is responsive to the input to the first order of the shift register, and each to provide an indication when both inputs are "1"; means to shift the data in the shift register; a plurality of counters, each having its input connected to the output of a coincidence means for accumulating the sum of coincidence indications of the corresponding coincidence means, whereby the sums accumulated in the counters are indicative of the autocorrelation function of the input word.

References Cited in the file of this patent

UNITED STATES PATENTS

| | | |
|---|---|---|
| 2,794,965 | Yost | June 4, 1957 |
| 2,840,308 | Van Horne | June 24, 1958 |
| 2,908,761 | Raisbeck | Oct. 13, 1959 |
| 2,982,853 | Price et al. | May 2, 1961 |